United States Patent [19]
Schmidt et al.

[11] Patent Number: 5,332,037
[45] Date of Patent: Jul. 26, 1994

[54] SQUEEZE CEMENTING METHOD FOR WELLS

[75] Inventors: Joseph H. Schmidt; Lamar L. Gantt; William H. Smalstig, all of Anchorage, Ak.

[73] Assignee: Atlantic Richfield Company, Los Angeles, Calif.

[21] Appl. No.: 976,602

[22] Filed: Nov. 16, 1992

[51] Int. Cl.⁵ .............................................. E21B 33/14
[52] U.S. Cl. ...................................... 166/276; 166/295
[58] Field of Search ................ 166/276, 285, 292, 295

[56] References Cited

U.S. PATENT DOCUMENTS

| | | | |
|---|---|---|---|
| 2,986,538 | 5/1961 | Nesbitt et al. | 166/295 X |
| 4,917,188 | 4/1990 | Fitzpatrick, Jr. | 166/295 |
| 5,121,795 | 6/1992 | Ewert et al. | 166/293 X |
| 5,211,234 | 5/1993 | Floyd | 166/276 |

*Primary Examiner*—William P. Neuder
*Attorney, Agent, or Firm*—Michael E. Martin

[57] ABSTRACT

Perforation tunnels and other voids or spaces in earth formations in communication with wells are sealed more effectively by injecting and pre-packing resin-coated particulates (sand) into such tunnels or voids and allowing the sand to consolidate to form a substantially rigid, permeable mass. A lead slurry of relatively fine grained cement is then injected to fill the interstices formed in the permeable material occupying the tunnels or voids. A larger or more coarse grain cement is then injected to form a substantially impermeable, rigid filter cake at the interface of the wellbore and the permeable mass to prevent loss of cement slurry out of the tunnels or voids before the cement is set. Vertical and deviated or generally horizontal wellbores having perforation tunnels or voids which suffer unwanted cement drainage prior to setting of conventional oil well cements are more effectively sealed by the sequential injection of the permeable material followed by injection of settable cement slurries.

8 Claims, 2 Drawing Sheets

SQUEEZE CEMENTING METHOD FOR WELLS

BACKGROUND OF THE INVENTION

1. Field of the Invention

The present invention pertains to an improved method of plugging perforations and other wellbore void spaces by squeeze cementing after placement of a cement retaining material such as a resin-coated proppant in the spaces to be occupied by the cement.

2. Background

In wellbore cementing operations, it is conventional practice to plug perforations and re-cement casing by a technique commonly known as squeeze cementing. In squeeze cementing, a column of cement is forced under pressure against the formation through the perforations to be plugged or by circulating cement under pressure into a wellbore void or space which is to be filled to secure wellbore structures, stop lost circulation or plug off particular portions of the wellbore. In plugging off perforations and other spaces, particularly in deviated or near-horizontal wellbores, it has been discovered that the location or configuration of the void or space, such as a so-called perforation tunnel, to be filled with cement may be such that, once the cement pressure has been relieved and the cement washed from the wellbore, cement will drain back out of the perforation tunnels or other spaces into the wellbore, thereby failing to form the plug or closure desired.

For example, in deviated or near-horizontal production wells, when a particular production zone has been depleted and it is desired to close the perforations and the perforation tunnels in the formation, the tunnels themselves may have grown substantially due to production of sand along with the fluid flowing from the formation into the wellbore. Accordingly, it is difficult to force enough cement into the expanded perforation tunnel which will solidify and place the depleted zone of the formation in a substantially fluid-impermeable condition. It is indicated from unsuccessful squeeze cementing operations that when cement is removed from the wellbore, at least some of the cement in the expanded perforation tunnel or other space in communication with the wellbore will flow back into the wellbore, thereby defeating the intended plugging effort.

It is contemplated that efforts to abandon non-productive or depleted zones, supplement faulty primary cementing jobs, isolate zones before perforating, repair defects such as joint leaks, split or parted casings and stop lost circulation also experience the same problems, in vertical as well as deviated or near-horizontal wellbores where force of gravity or formation pressures will force cement out of a space which it is intended for the cement to occupy. However, the present invention overcomes these problems in cementing wellbore perforation tunnels and other wellbore spaces as will be appreciated by those skilled in the art upon reading the following summary, detailed description and claims.

SUMMARY OF THE INVENTION

The present invention provides an improved method for squeeze cementing wellbore spaces such as perforation tunnels, annular areas between an earth formation and a wellbore casing and other well spaces to be occupied by cement.

In accordance with an important aspect of the present invention, wellbore spaces including perforation tunnels and the like, are filled or "pre-packed" with a material which forms a porous or permeable structure which will not flow back out of the space and which will accommodate or receive unset cement and substantially prevent such cement from flowing out of the space until the cement has set and formed a rigid, non-permeable plug. One preferable material for forming the porous structure is curable, resin-coated sand or similar materials used as hydraulic fracture proppants. Such materials are injected into the wellbore prior to the cementing operation to fill perforation tunnels and other spaces which are likely to allow cement to drain therefrom prior to setting of the cement.

The present invention provides improved squeeze cementing operations, in particular, to provide more effective isolation of previously produced zones, repair defects such as split or parted casings, stop lost circulation and supplement primary cementing operations when the cement fails to reach desired spaces in a well.

Those skilled in the art will further appreciate the advantages and superior features of the invention upon reading the detailed description which follows in conjunction with the drawing.

DESCRIPTION OF A PREFERRED EMBODIMENT

Figures 1, 2:
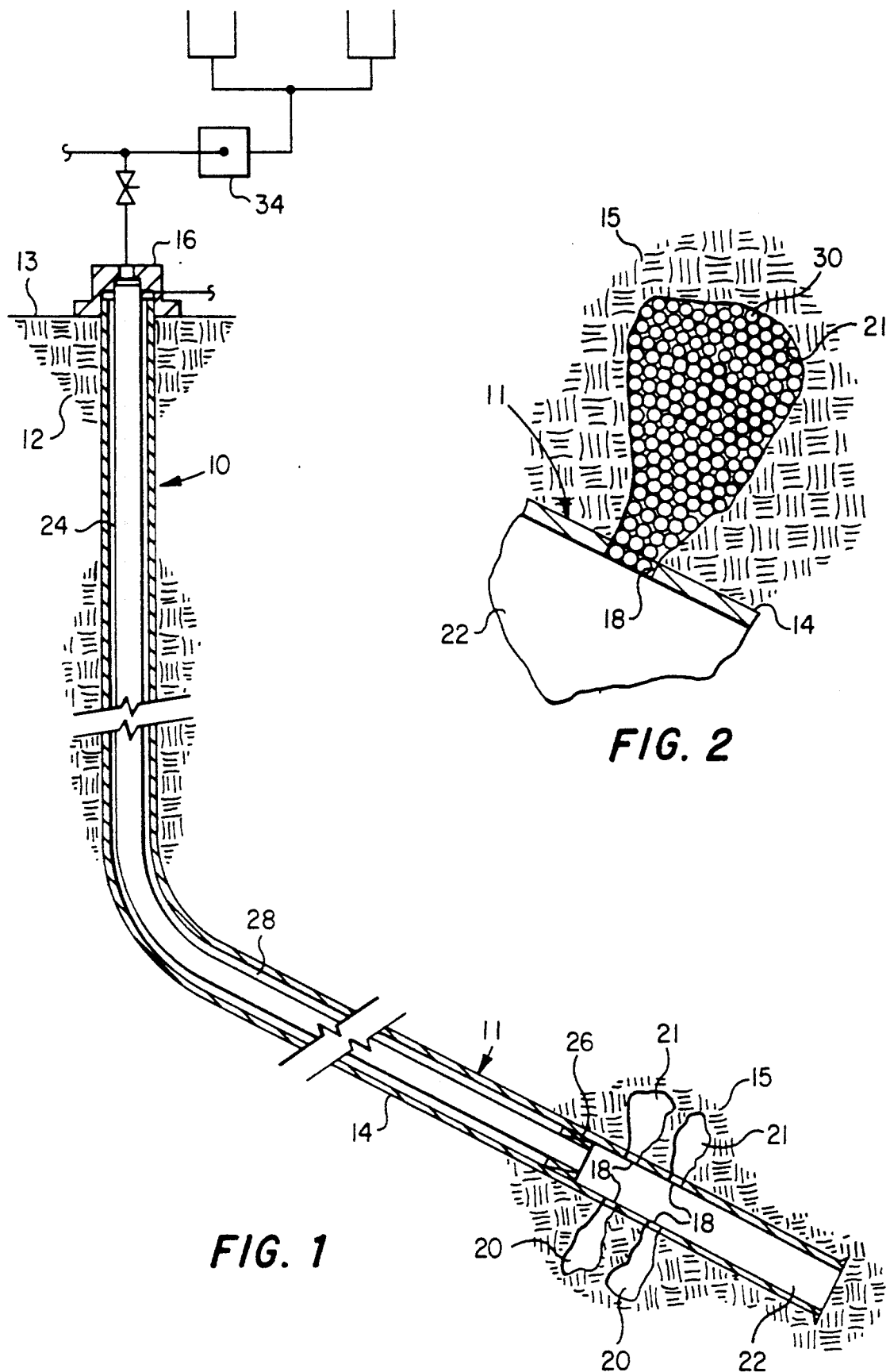
FIG. 1 is a schematic view illustrating a deviated wellbore which is being prepared for squeeze cementing to plug perforations and perforation tunnels in a formation zone which is to be isolated from the wellbore.
FIG. 2 is a detail view on a larger scale showing a perforation tunnel which has been filled with a porous cement-retaining material prior to effecting the squeeze cementing operation.

In the description which follows, like elements are marked throughout the specification and drawing with the same reference numerals, respectively. The drawing figures are substantially schematic in form and may be simplified or exaggerated in scale to better illustrate the invention.

Referring to FIG. 1, there is illustrated in somewhat schematic form a fluid-producing well 10 which has been drilled into an earth formation 12. The well 10 includes a conventional casing 14 and wellhead 16, the latter installed at the earth's surface 13. The well 10 is shown to have a somewhat deviated portion 11 and the casing 14 has been perforated at perforations 18 through which fluid has been produced from a formation zone 15. Somewhat enlarged perforation tunnels 20 and 21 have resulted from the production of fluids from the formation zone 15 into the wellbore portion 22 and then to the surface.

In the illustration of FIGS. 1 and 2, the well 10 has been prepared for a so-called squeeze cementing operation to plug the perforation tunnels 20 and 21 so that fluid may be produced from another zone of interest, not illustrated. In this regard, a tubing string 24 has been installed extending from the wellhead 16 and the wellbore space 22 has been isolated from the remainder of the wellbore by a retrievable packer 26 of conventional construction. The packer 26 may include suitable bypass valve means, not shown, so that fluid may be circulated through the tubing string 24 into the space 22 and then out of the space through the annulus 28 back to the surface in a conventional manner.

As illustrated in FIG. 1, at least some of the perforation tunnels 21 are generally above the wellbore space 22 so that gravity alone would likely cause flowable substances to flow out of these tunnels into the wellbore space 22. It has been determined that, in conventional squeeze cementing operations wherein a flowable cement slurry is pumped down into the wellbore space 22 and into the perforation tunnels 20 and 21 by way of the tubing string 24, an incomplete or insufficient plugging of the perforation tunnels 21, in particular, has occurred. It is believed that this improper cementing results from back-flowing of cement out of the perforation tunnels or voids 21, in particular, when the pressure is reduced and the cement slurry is removed from the wellbore space 22. Even if a layer of cement "filter cake" builds up on the walls of the perforation tunnels 20 and 21, if the entire tunnel space or void is not retained full of cement, there is little support for such layer of filter cake once the unset cement drains back into the wellbore. This results in cracking of the layer of filter cake and fluid leakage between the perforation tunnel and the wellbore at a later time. For example, in voids which are only partially filled with cement, the cement layer on the void wall is eventually placed in tension due to wellbore fluid pressures and, due to the low tensile strength of the cement layer, it will usually fail to seal the formation. Evidence of improper plugging of abandoned perforations and other wellbore spaces which are desired to be plugged has been experienced, particularly in deviated or generally horizontal wellbores where gravity forces will cause a large portion of the unset cement to drain back into the wellbore from the space or void that is desired to be retained full of cement.

However, in accordance with the improved method of the present invention, it is contemplated that wellbore perforations and perforation tunnels together with other voids which are desired to be filled and plugged with cement may be properly plugged by, prior to the cementing operation, filling such tunnels and voids with a particulate material which will form a substantially porous or permeable mass which will not flow out of the space or void. The porous or permeable structure will, however, receive cement slurry at a later time during a conventional cementing or squeeze cementing operation and retain such cement slurry and thus form a strong, substantially fluid impermeable plug for perforation tunnels and other wellbore spaces or voids. One material, in particular, which is useful in forming a permeable, but somewhat rigid mass is resin-coated hydraulic fracturing proppant. This particulate material is basically a resin-coated sand of a predetermined grain size which, under predetermined temperature and pressure conditions or upon exposure to a suitable activator material, will cause the resin to "cure", thereby bonding the coated particles to each other to form a substantially rigid, non-flowable mass which is permeable and which will accept slurry-like materials to fill the small voids or interstices between the bonded particles.

One type of curable resin-coated material which is believed to be suitable for use in the method according to the present invention is sold under the trademark ACME by Halliburton Services, Duncan, Okla. This material is coated with a temperature-sensitive resin which, in response to injection into a formation void which has a predetermined ambient temperature, will cause the particles to bond to each other to form a substantially rigid permeable structure of significant compressive and tensile strength and having a permeability which will permit slurries or viscous fluids to fill the voids or spaces between the bonded particles. Other types of resin materials which may form a bonded matrix in the perforation tunnels 20 and 21 or other wellbore voids to be filled are those described in U.S. Pat. Nos. 4,875,525 to Mana and 5,048,608 to Wiser-Haliday, both assigned to the assignee of the present invention, and both incorporated by reference herein.

FIG. 2 illustrates in detail one of the perforation tunnels 21 which has been filled with a permeable, bonded matrix-forming material, generally designated by the numeral 30. The material 30 may be one of the above-mentioned resin-coated proppants. The interstices formed by the material 30 are subsequently filled by cement slurry under pressure and the material 30 greatly aids in retaining the cement in the void or space formed by the perforation tunnel 21 until the cement has thoroughly set to form a high-strength impermeable mass which will close off the flow of fluid between the perforation tunnel 21 and the wellbore space 22. Other spaces which are desired to be isolated from fluid flow between the formation and the wellbore may be similarly treated.

In accordance with one preferred method of the present invention, the tubing string 24 and the packer 26 are installed such that the spaces or voids, such as the tunnels 20 and 21, to be filled are in communication with the tubing string. The tubing string 24 is placed in communication with a suitable pump 34 which is operable to pump a slurry of the permeable material such as the above-mentioned forms of resin-coated proppant into the wellbore space 22 and to be packed into the spaces or voids formed by the tunnels 20 and 21. If the material 30 is coated with a thermal-setting resin, the characteristics of this resin are selected such that, upon exposure to the formation ambient temperature, the resin will fuse or bond the proppant particles together to form a porous matrix, the porosity of which may be increased in accordance with the method of U.S. Pat. No. 4,875,525. Formation temperature can be determined by conventional well logging instruments prior to injection of the material 30.

After the matrix-forming material has been pumped into the voids or spaces such as the perforation tunnels 21 and possibly allowed to begin the consolidation or setting procedure, the material remaining in the wellbore space 22 may be circulated out by a suitable solvent or carrier liquid pumped down through the tubing string 24 and returned through the annulus 28. A coilable tubing string, not shown in FIG. 1, may be inserted into the wellbore space 22 through the tubing string 24 so that wellbore space 22 is sufficiently flushed by a circulation fluid without flushing the cement-retaining proppant or matrix-forming material out of the perforation tunnels 20 and 21. After the residual material 30 is circulated out of the wellbore and the material 30 caused to bond or form a porous, somewhat rigid mass, a cement slurry may be injected into the wellbore space 22 under sufficient pressure to cause it to flow into the perforation tunnels or voids 20 and 21. One method of injecting the cement may be so-called conventional squeeze cementing wherein a cement slurry is pumped down through the tubing string 24 and into the space 22 and is forced out into the spaces 20 and 21 under substantial pressure. The cement slurry will flow through the interstices formed in the matrix of proppant occupying the perforation tunnels or similar void spaces and will not tend to flow back out of these spaces, but will, upon setting, form a substantially rigid mass having substantial compressive and tensile strength and being substantially fluid impermeable. The cement slurry is preferably characterized by two separate slurries of relatively fine and coarse particle size, respectively, and as described further herein.

Figure 3:
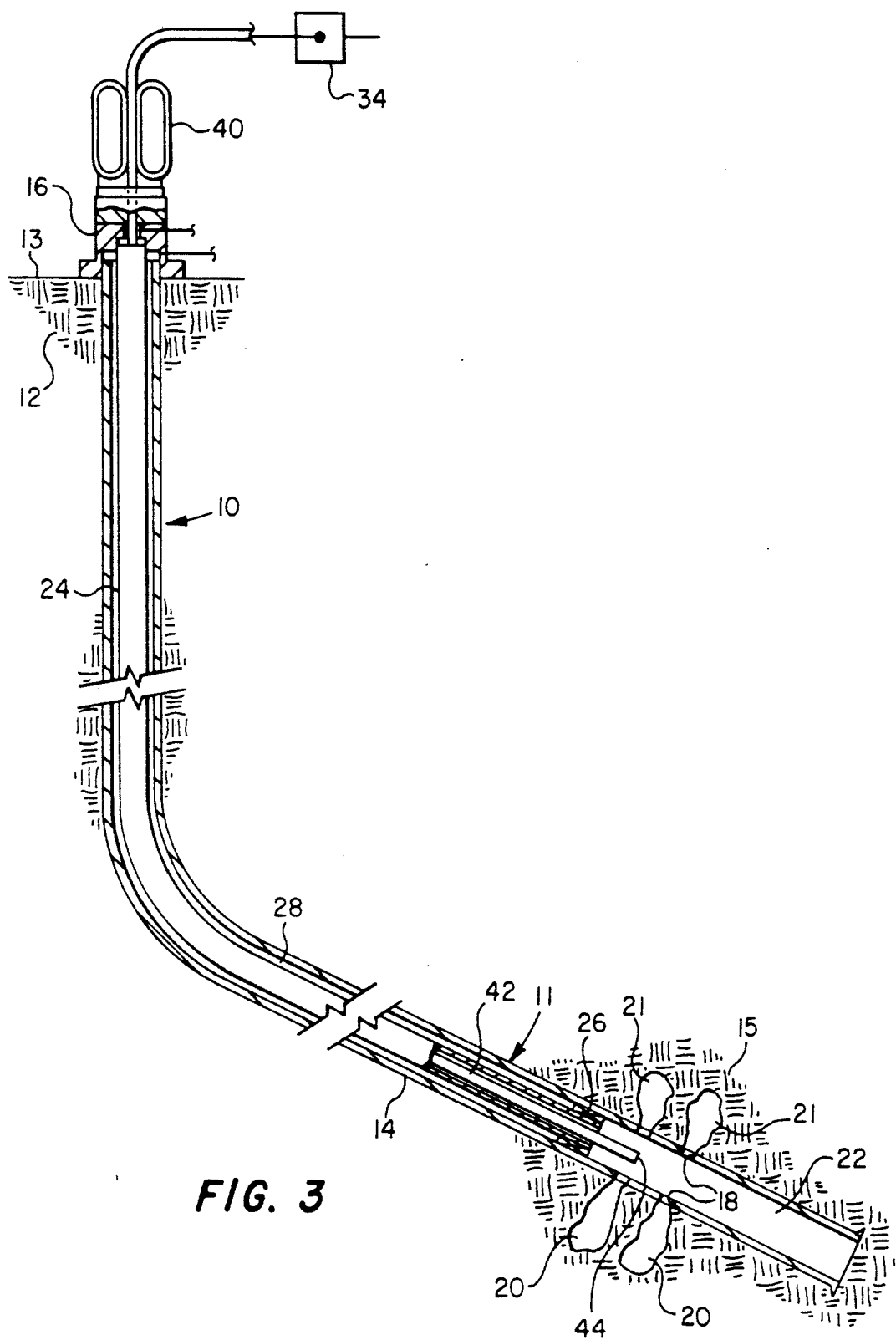
FIG. 3 is a view similar to FIG. 1 showing the method being carried out using coiled tubing.

Another method of injecting cement into the perforation tunnels 20 and 21 may utilize the method described in U.S. Pat. No. 4,627,496, issued Dec. 9, 1986 to Ashford, et. al. and assigned to the assignee of the present invention. This patent is also incorporated into this specification by reference. Referring to FIG. 3, for example, a coiled tubing injection unit 40 is shown mounted on the wellhead 16 for injecting a length of coiled tubing 42 through the tubing string 24 and into the wellbore space 22. The tubing string 42 is delimited by a distal end 44 from which cement slurries and other fluids may be injected into the wellbore space 22 through the coiled tubing 42 and by way of a pump 34. Certain well-known structures such as the coiled tubing reel and the apparatus for connecting the coiled tubing to receive fluid from the pump 34 are omitted in the interest of clarity and conciseness.

Preparation of a well, such as the well 10, for filling the void spaces 20 and 21 may be carried out by conditioning the well initially by inserting the coiled tubing 42 into communication with the space 22 and performing clean-up operations. For example, debris in the wellbore may be circulated out by pumping water or an acid/water solution into the wellbore space through the coiled tubing 42 and returning the wash through the annulus formed between the tubing 24 and the coiled tubing 42 or the annulus formed between the tubing 24 and the casing, if the packer 26 has a bypass valve. Conventional wash solutions may be used for the preconditioning operation. After conditioning the wellbore space 22 for receiving the resin-coated proppant, the coiled tubing 42 may be removed from the tubing 24 and the ambient temperature in the formation 15 measured by running a suitable logging instrument, not shown, into the space 22. A slurry of resin-coated material is then formulated and injected into the space 22 as well as the spaces 20 and 21 through the tubing string 24. If the ambient temperature in the formation zone 15 is not sufficient to cure the resin of the resin-coated material, certain curing chemicals may be injected to accelerate or facilitate the curing action. When it is determined that the resin-coated sand or proppant slurry has reached the spaces 20 and 21, operating conditions are monitored to determine when "screen-out" or complete filling occurs and the slurry is held in the spaces 20 and 21 under pressure until substantial curing of the resin takes place to form the non-flowable mass.

After suitable time has elapsed for complete curing of the resin, the coiled tubing 42 is re-inserted with a suitable jetting nozzle, not shown, attached to the distal end 44 to flush the proppant material in the space 22 out of the wellbore. The flushing process may require use of a solvent such as acetone to loosen the material in the space 22 for flushing to be complete. It may also be desirable when using the method of this invention in a fluid injection well, for example, to condition the spaces to be occupied by cement with a further period of injection of relatively clear water.

When the cementing operation is commenced, it may be desirable to inject the cement in a multi-stage operation wherein a relatively fine cement mix is injected initially followed by injection of a cement having more coarse or larger diameter cement and aggregate particles. A paper entitled: "Case Histories Regarding the Application of Micro-Fine Cements" by J. F. Heathman and L. E. East, Jr., published by the Society of Petroleum Engineers, Richardson, Texas as IADC/SPE 23926 describes some features of fine cements and placement methods. The use of a fine cement, initially, provides some assurance of better cement penetration into the small interstices and channels in the permeable mass which has been preplaced in the voids. The injection of the fine cement is preferably followed by injection of conventional, more coarse particle cement such as a latex acid-resistant type. Conventional squeeze cementing operations through the tubing 24 or the coiled tubing 42 may be carried out during the cement injection process. Cement in the wellbore space 22 may then be circulated out with a water or water-biozan gel solution.

Still further, primary well cementing techniques may also be enhanced by the method of the present invention although squeeze cementing processes are particularly improved by the method described and claimed herein. Although a preferred method according to the invention has been described in detail, those skilled in the art will recognize that various substitutions and modifications may be made without departing from the scope and spirit of the appended claims.

What is claimed is:

1. A method for sealing at least one of perforation tunnels and voids in an earth formation in communication with a deviated wellbore by way of perforations in a casing disposed in said wellbore, which tunnels and voids cannot retain a cement slurry along, comprising the steps of:

injecting a resin-coated particulate material into said one of said perforation tunnels and voids through said perforations and causing said particulate material to consolidate and bond to form a substantially rigid, permeable mass; and injecting a cement slurry into said well and into said one of said perforation tunnels and voids through said perforations to fill the interstices formed by said particulate material and allowing said cement slurry to set to substantially prevent flow of fluids between said formation and said wellbore through said one of said perforation tunnels and voids.

2. The method set forth in claim 1 wherein:

said particulate material is coated with a thermal-setting resin which bonds particles of said particulate material together at the nominal temperature of the earth formation defining said one of said perforation tunnels and voids to form a fluid permeable matrix.

3. The method set forth in claim 2 including the steps of:

injecting a fluid into said wellbore to dissolve said resin to effect removal of said particulate material from said wellbore.

4. The method set forth in claim 3 including the step of:

injecting said cement slurry into said one of said perforation tunnels and voids after removing said particulate material from said wellbore and allowing said cement slurry to set to form a substantially fluid-impermeable mass occupying said one of said perforation tunnels and voids to seal said formation from communicating fluid between said formation and said wellbore through said perforations.

5. The method set forth in claim 2 including the step of:
   circulating excess particulate material out of said wellbore prior to injecting cement into said wellbore and into said one of said perforation tunnels and voids.

6. The method set forth in claim 1 including the step of:
   circulating cement slurry out of said wellbore.

7. The method set forth in claim 6 including the steps of:
   injecting a fluid into said wellbore to prevent setting of cement in said wellbore prior to circulating said cement out of said wellbore.

8. The method set forth in claim 1 wherein:
   the step of injecting said cement slurry comprises injecting a relatively fine grain cement slurry followed by injecting a more coarse grain cement slurry.

* * * * *